United States Patent Office 3,485,863
Patented Dec. 23, 1969

3,485,863
PARTIAL PHENYLATION OF CHLOROSILANES
Karl Nutzel and Walter Noll, Opladen, and Engelbert Walaschewski, Cologne-Stammheim, Germany, assignors to Farbenfabriken Bayer Aktiengesellschaft, Leverkusen, Germany, a corporation of Germany
No Drawing. Filed Dec. 28, 1966, Ser. No. 605,157
Claims priority, application Germany, Jan. 11, 1966, F 48,132
Int. Cl. C07f 7/12
U.S. Cl. 260—448.2   5 Claims

ABSTRACT OF THE DISCLOSURE

Process for the controlled phenylation of chlorosilanes to provide compounds of the formula:

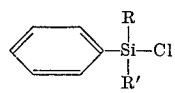

wherein R and R' are each one of chlorine, phenyl, alkyl or cycloalkyl by forming a dilute solution of a silane of the formula:

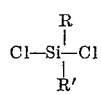

in at least the same volume of an inert solvent, preparing a suspension of sodium phenyl in an inert dispersion medium in a concentration of at most 1 mol sodium phenyl/l., cooling the dilute silane solution to −20 to −80° C. and under vigorous stirring introducing the sodium phenyl suspension into the silane solution using the former in an amount stoichiometrically corresponding to the desired degree of phenylation and taking at least 30 minutes to complete the addition.

---

This invention relates to the partial phenylation of chlorosilanes, and is especially concerned with the controlled production of phenyl-substituted organo-chloro silanes of the general formula

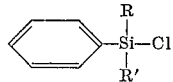

in which each of the substituents R and R' (same or different) is a chlorine atom, a phenyl radical or an alkyl radical having 1 to 24 carbon atoms which may be cyclic, especially a methyl radical, by phenylation of a chlorosilane of the general formula

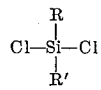

It is known to carry out this phenylation with cooling, for example to temperatures between −5 and −17° C., by means of a suspension of sodium-phenyl in an inert dispersing agent, but this method has hitherto not achieved any technical importance because the reaction could not be sufficiently controlled. Instead of a phenylation graded in accordance with the desired product, there were mainly obtained the almost useless tetraorganosilanes, at best in admixture with triorgano-monochlorosilanes which are generally not much in demand. Referred to the silane used and, in particular, to the sodium-phenyl, which cannot be recovered even when an excess is used, the yields of monophenyl trichlorosilane obtained from silicon tetrachloride by the method hitherto used, and also of the usually especially desired diorganodichlorosilanes obtained from silicon tetrachloride or a mono-organo-tricholrosilane, are unsatisfactory.

Also, in a one-step reaction according to Wurtz-Fittig using sodium and chlorobenzene without the previous preparation of sodium-phenyl, which is more difficult to carry out, silicon tetrachloride can only be converted into phenyl-trichlorosilane, diphenyl-dichlorosilane and triphenyl-chlorosilane in proportions of about 5 to 17% each, whereas the remainder is perphenylated.

It has now been found that a higher proportion of silanes of a pre-determined degree of phenylation, i.e. in particular a low degree of phenylation, can be achieved by observing a combination of definite reaction conditions, in that dilution, cooling and stirring of the silicon compound are carried substantially further than has hitherto been proposed and that the addition of the phenylating agent is delayed.

According to the invention a process for the controlled production of silane derivatives of the general formula

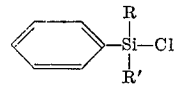

wherein the substituents R and R' are as aforesaid, comprises providing a dilute solution of a silane derivative of the general formula

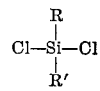

in at least the same volume of an inert solvent, providing a suspension of sodium-phenyl in an inert dispersing medium in a concentration of at most 1 mol $C_6H_5Na$ per litre, cooling the dilute solution to a temperature of between −20 and −80° C. whilst stirring vigorously, and simultaneously adding to the dilute solution an amount of the suspension stoichiometrically corresponding to the desired degree of phenylation, the addition of the suspension taking place evenly over a period of at least 30 minutes.

Preferably the suspension is added over a period of 1 to 3 hours, and preferably the suspension is also cooled. The preferred temperature of the solution is between −20 and −40° C.

The sodium-phenyl suspension may be obtained in known manner from sodium and chlorobenzene, for example by introducing 92 g. of the metal in small pieces into 1 litre of toluene or another suitable dispersing agent with the exclusion of air, heating the mixture to the melting point of sodium and dispersing it, for example by means of a vibrating mixing device, allowing the mixture to cool to 10° C., adding 224 g. chlorobenzene dropwise while cooling to 10 to 15° C., and continuing the mixing for a further 1 to 2 hours. The suspension used in the examples described below was obtained thus. The concentration of sodium-phenyl in the suspension can be reduced to any extent, economic consideration being the only limit.

Depending upon the silane derivative to be phenylated and the desired silane derivative, there is used a quantity of the sodium-phenyl suspension such that 1, 2 or 3 molecules of $C_6H_5Na$ are used for every silicon atom, as shown by the following reaction equations:

$$Cl_2SiRR' + C_6H_5Na \rightarrow ClSi(C_6H_5)RR' + NaCl$$

$$Cl_3SiR + 2C_6H_5Na \rightarrow ClSi(C_6H_5)_2R + 2NaCl$$

$$Cl_4Si + 3C_6H_5Na \rightarrow ClSi(C_6H_5)_3 + 3NaCl$$

The period of time of at least 30 minutes, during which the phenylating agent is added to the chlorosilane solution, may also exceed 3 hours, but this presents no particular economic advantage.

Aromatic, alphatic and cycloaliphatic hydrocarbons are suitable for diluting the silane derivatives, and examples of suitable diluents are benzene, toluene, xylene, hexane and cyclohexane. Solvents which are electron donors, such as dialkyl ethers, cyclic ethers and trialkylamines, can also be used for this purpose, especially in admixture with hydrocarbons.

The same solvents can be used for dispensing the sodium, provided that their boiling point is higher than the melting point of the metal; in the case of ethers, however, it should be noted that they may react, when in prolonged contact with sodium-phenyl, to form alcoholates.

During the process as well as during the preparation of the sodium-phenyl, the access of air or water must be excluded. It is therefore advantageous to use a protective atmosphere of inert gas, such as very pure nitrogen or argon, which may also have excess pressure without disadvantage. Isolation of the phenylation products is performed by known methods.

The following examples are given for the purpose of illustrating the invention.

EXAMPLE 1

292 grams diphenyl-dichlorosilane and 292 g. toluene are introduced, with the exclusion of air and moisture, into a flask fitted with stirrer, thermometer and dropping funnel. The content of the flask is cooled externally to −20° C. and 1 liter of the sodium-phenyl suspension described above is added dropwise with intense stirring over a period of 2 hours. Cooling is then interrupted and the reaction mixture is further stirred for 1 to 2 hours. The mixture is then heated at 100° C., filtered hot with the exclusion of air, the sodium chloride remaining on the filter is washed with a little hot toluene, and the solvent is evaporated off from the combined filtrates. The desired triphenyl-chlorosilane is obtained from the residue by fractional distillation under a pressure of 0.2 mm. Hg in a yield of 88% referred to the sodium-phenyl used.

EXAMPLE 2

Using the process steps described in Example 1 a mixture of 264 g. phenyl-trichlorosilane and 264 g. toluene is reacted at −30° C. with 1 litre of the sodium-phenyl suspension described above. The yield of diphenyl-dichlorosilane amounts to 82% referred to the sodium-phenyl used.

EXAMPLE 3

Again using the process described in Example 1 a mixture of 100 g. silicon tetrachloride, 675 cc. dioxan and 675 cc. toluene is reacted at −30° C. with 1 litre of the sodium-phenyl suspension. The desired diphenyl-dichlorosilane is obtained in a yield of 61.5% referred to the sodium-phenyl used. The other fractions consist of approximately equal parts by weight of phenyl-trichlorosilane and triphenyl-chlorosilane.

EXAMPLE 4

Again in analogy with Example 1 a mixture of 700 g. methyltrichlorosilane and 300 g. diethyl ether is reacted at −30° C. with 1 litre of the sodium-phenyl suspension. The yield of phenylmethyl-dichlorosilane amounts to 78% referred to the sodium-phenyl used.

What we claim is:

1. Process for the controlled production of a silane derivative of the formula:

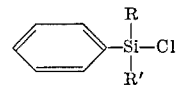

in which R and R' are each a member selected from the group consisting of chlorine, phenyl, cycloalkyl and alkyl having 1 to 24 carbon atoms, which comprises providing a dilute solution of a silane derivative of the formula:

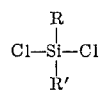

wherein R and R' are as above defined, in at least the same volume of an inert solvent, providing a suspension of sodium-phenyl in an inert dispersing medium in a concentration of at most 1 mol $C_6H_5Na$ per litre, cooling the dilute solution to a temperature of between −20 and −80° C. while stirring vigorously, and simultaneously adding to the dilute solution an amount of the suspension stoichiometrically corresponding to the desired degree of phenylation, the addition of the suspension taking place evenly over a period of at least 30 minutes.

2. Process as claimed in claim 1 wherein the addition of the suspension takes place over a period of 1 to 3 hours.

3. Process as claimed in claim 1 wherein the suspension is also cooled to a temperature of between −20 and −80° C.

4. Process as claimed in claim 1 wherein the inert dispersing medium is a member selected from the group consisting of aromatic hydrocarbons, aliphatic hydrocarbons, cycloaliphatic hydrocarbons, dialkyl ethers, cyclic ethers, trialkylamines and mixtures thereof, each of said group members having a boiling point higher than the melting point of sodium.

5. Process as claimed in claim 1 wherein the reaction is carried out under an atmosphere of a member selected from the group consisting of pure nitrogen and argon.

References Cited

UNITED STATES PATENTS 2,974,157  3/1961  Jex _____ 260—448.2 X
3,062,854  11/1962 Dickey et al. _____ 260—448.2 X
3,304,319  2/1967  Weyenberg.

OTHER REFERENCES

Bazant et al., "Organosilicon Compounds," vol. 1, Academic Press Inc., New York, Aug. 22, 1965, pp. 187–189.

TOBIAS E. LEVOW, Primary Examiner

P. F. SHAVER, Assistant Examiner